Jan. 27, 1931.  A. CONGELLIER  1,790,462
VALVE STRUCTURE
Filed April 5, 1929

Inventor
A. Congellier

Patented Jan. 27, 1931

1,790,462

UNITED STATES PATENT OFFICE

ANTHONY CONGELLIER, OF MILWAUKEE, WISCONSIN

VALVE STRUCTURE

Application filed April 5, 1929. Serial No. 352,654.

This invention relates to new and useful improvements in valve structures.

One of the objects of my invention is the provision of an improved valve structure adapted to be used in connection with internal combustion engines and is particularly adapted for use in an engine of the type illustrated in Patent No. 1,594,664 which was granted to me August 3, 1926. The type of valve necessary in an engine of this character is such that the valve member must be tightly retained in its seat at all times to prevent leakage other than through the proper passageway for the fuel in feeding the fuel to the cylinder.

A further object of my invention is the provision of a valve for internal combustion engines wherein the valves are of the rotary type and are retained in a tightly seated position at all times and wherein means is provided to compensate for the wear of the valve and its seat so as to eliminate any looseness between the valve and its seat which might occur through constant wear.

A further object of my invention is the provision of a valve of the above type wherein the parts are so constructed and arranged that they may be quickly and readily disassembled or assembled and if it is necessary to replace any new parts, the parts of the valve are constructed in a manner whereby they can be easily replaced at a very small cost.

Figure 1:
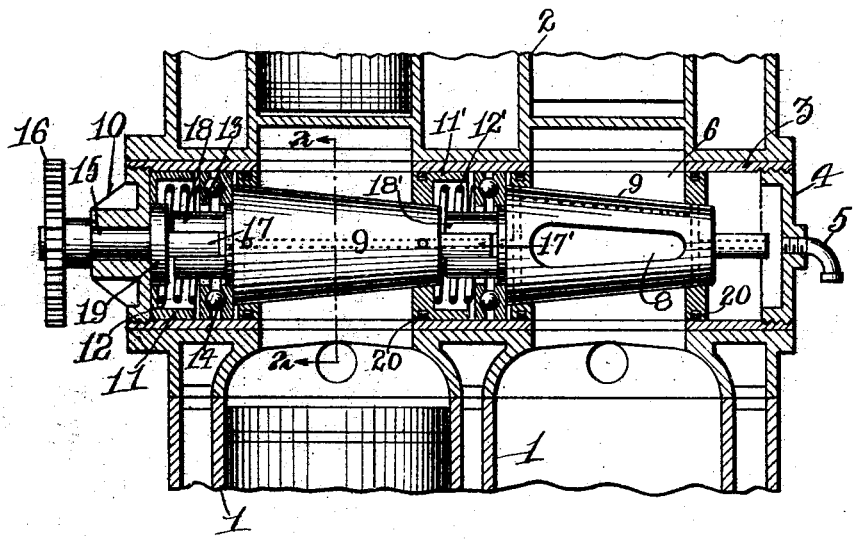
Figure 2:
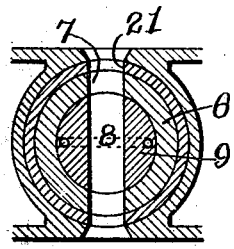

With the above and other objects in view, the invention consists in the novel features of construction, the combination and arrangement of parts hereinafter more fully set forth, pointed out in the claim and shown in the accompanying drawings wherein:

Figure 1 is a sectional view taken through an internal combustion engine, illustrating the application of my improved valve with parts of the valve in elevation; and, Figure 2 is a transverse sectional view on the line 2—2 of Figure 1.

Referring more particularly to the drawings, it will be noted that I have illustrated a portion of an internal combustion engine of the type illustrated in the patent referred to above, which includes the main cylinders 1 and the auxiliary cylinders 2, arranged between the auxiliary cylinders and the main cylinders is the valve chamber in which is located a sleeve 3, one end of this sleeve being closed by means of a removable cap plate 4 threaded into the interior of the sleeve 3. The plate 4 is provided with an oil feed connection 5 leading to the interior of the sleeve 3.

Arranged within the sleeve 3 and disposed between the cylinders 1 and 2 are the valve blocks 6, said valve blocks being provided with oppositely disposed openings 7 adapted to provide communication between the cylinders 1 and 2 through the transverse passages 8 formed in the tapering rotary valve members 9.

The valve blocks 6 are provided with conical seats in which the substantially conical valve members 9 are arranged and these valve members 9 are normally maintained in a tightly seated position by means of thrust bearings which bear against the large end of the valves. The end of the sleeve 3 opposite the plate 4 is closed by means of a bearing block 10 threaded into the interior of the sleeve 3 and within the sleeve 3 adjacent the block 10 is a cup member 11 adapted to receive a coil spring 12 which bears against the thrust bearing 13 for retaining one of the valve members in its seated position.

This thrust bearing comprises opposed bearing plates having ball recesses therein to receive the bearing balls 14 and the plates are normally maintained in tight fitting engagement with the balls by means of the coil spring 12.

One of the bearing blocks 6 is provided in one end with a cup member 11' similar to cup 11 and is adapted to receive the spring 12' for retaining the thrust bearing against the adjacent valve member. Each valve member, as illustrated, is provided with a thrust bearing and with a heavy coil spring for retaining the thrust bearings in operative positions.

Mounted in the bearing block 10 is a stub shaft 15, upon the outer end of which is a pinion 16 adapted to have operative connection with the main shaft of the engine for rotating the valve members 9 at the proper rate of speed. The inner end of the shaft is formed with a tongue 17 adapted to fit between spaced ears 18 on the valve member for rotating the valve upon rotative movement of the shaft 15. Outer movement on the part of the shaft is prevented by means of the annular collar 19 bearing against the inner face of the block 10.

The valve 9 which is directly connected to the shaft 15 is provided at its smaller end with a tongue 17' fitting between the two oppositely disposed ears 18' on the large end of the next valve in line so that both valve members will be rotated simultaneously, but attention is directed to the fact that the transverse openings 8 in the valve members are preferably disposed at different positions so that fuel may be fed into the cylinders at different times.

The valve blocks 6 are provided with annular recesses in which the packing rings 20 are arranged, said packing rings engage the interior surface of the sleeve 3 to prevent leakage between the cylinders and the exterior of the blocks. It will be noted that the sleeve 3 is provided with oppositely disposed openings 21 which are adapted to align with the openings 7 in the valve blocks and also with the openings 8 in the valves whereby to provide direct communication between the cylinders 1 and 2 when the openings 8 in the valves are aligned with the openings 7 and 21.

It will be apparent from the foregoing that I have provided a simple and inexpensive valve structure for internal combustion engines wherein the valve structure is formed of separable parts whereby the structure can be readily assembled or disassembled and the parts readily replaced when found necessary. Through the medium of the pressure springs and the thrust bearings, the valves 9 are always maintained in a seated position within the block 6 and the tension of the springs 12 and 12' will take up the slight wear between the valves and their seats.

The specific connection between the valve members and the driving mechanism which includes the spaced ears 18 and 18' and the tongues 17 and 17' provide for simultaneous rotation of the valve members, but at the same time permits a certain amount of longitudinal movement on the part of the valves whereby upon wearing away of the valves or their seat, the amount of wear will be readily taken up through the longitudinal movement of the valves.

While I have shown and described the preferred embodiment of my invention, it will be apparent that slight changes may be made in the construction when putting the invention into practice without departing from the spirit of the same or the scope of the appended claim.

In addition to the advantages previously mentioned, owing to the fact that the valve is conical, when the same is subjected to variations in temperatures, it will contract and expand. Hence, owing to the conical formation, when said contraction and expansion is taking place, the valve will adjust itself longitudinally in or out with relation to its seat, so as to insure a tight joint at all times without the possibility of binding.

Furthermore, as noted in Figure 1 of the drawing, the valve plug is provided with suitable oil ducts, as indicated in dotted lines, which will effectually lubricate the journals.

I claim—

Valve construction of the class described including a sleeve, a removable cap plate at one end, spaced valve blocks within said sleeve, tapering valve members arranged within said blocks with their smaller ends extending in the same general direction, a thrust bearing in the sleeve normally bearing against each individual valve member at the rear end thereof, a cup member at the larger end of each valve member, a coil spring in each cup bearing against each thrust bearing to normally maintain the valve members in a seated position and permit longitudinal movement thereof in one direction, a bearing block closing the end of the sleeve opposite the removable cap plate, and means connecting said valve members for simultaneous rotation.

In testimony that I claim the foregoing I have hereunto set my hand at Milwaukee, in the county of Milwaukee and State of Wisconsin.

ANTHONY CONGELLIER